United States Patent

[11] 3,622,798

[72] Inventors Shigeyuki Ochi;
Tetsuo Ando, both of Tokyo, Japan
[21] Appl. No. 868,800
[22] Filed Oct. 23, 1969
[45] Patented Nov. 23, 1971
[73] Assignee Sony Corporation
Tokyo, Japan
[32] Priorities Oct. 23, 1968
[33] Japan
[31] 43/76921;
July 31, 1969, Japan, No. 44/60884

[54] INTEGRATED LOGIC CIRCUIT
6 Claims, 39 Drawing Figs.

[52] U.S. Cl. .......... 307/205,
307/221, 307/238, 307/246, 307/251, 307/279
[51] Int. Cl. .......... H03k 17/60
[50] Field of Search .......... 307/205,
238, 246, 251, 279, 304, 293, 221 C

[56] References Cited
UNITED STATES PATENTS
3,524,077 8/1970 Kaufman .......... 307/246
OTHER REFERENCES
Boysel et al., Multiphase Clocking Achieves 100– N Sec. MOS Memory, Electronic Design News, June 10, 1968, pp. 50–52, 54, & 55.

*Primary Examiner*—Stanley T. Krawczewicz
*Attorneys*—Lewis H. Eslinger, Alvin Sinderbrand and Curtis, Morris & Safford

ABSTRACT: An integrated circuit having a combinational circuit and two field effect transistors formed on a common semiconductor substrate, and in which the two field effect transistors are made conductive alternately by two clock pulses without a direct current source.

INVENTORS
SHIGEYUKI OCHI
TETSUO ANDO

BY By: Lewis H. Eslinger
ATTORNEYS

INVENTORS
SHIGEYUKI OCHI
TETSUO ANDO
BY
By: Lewis H. Eslinger
ATTORNEYS

INVENTORS
SHIGEYUKI OCHI
TETSUO ANDO
BY By: Lewis H. Eslinger
ATTORNEYS

INVENTORS
SHIGEYUKI OCHI
TETSUO ANDO
BY
ATTORNEYS

INVENTORS
SHIGEYUKI OCHI
TETSUO ANDO
BY
By: Lewis H. Eslinger
ATTORNEYS

INTEGRATED LOGIC CIRCUIT

This invention relates generally to integrated logic circuits, and more particularly to ratioless-type integrated logic circuits using two-phase clock pulses.

Metal insulator semiconductor (MIS) field effect transistors or metal oxide semiconductor (MOS) transistors have been recently employed in digital logic circuits for the following reasons.

Large-scale integrated circuits using the MOS transistors require relatively few diffusion processes in manufacture and hence are relatively easily fabricated with a low percentage of rejects due to manufacturing defects. Further, such integrated circuits have a relatively low power consumption. However, a logic circuit employing a conventional ratio-type MOS transistor requires many large-sized MIS transistors as loads and this imposes a limitation on the number of transistors that can be provided on a semiconductor substrate of a given size.

Although a conventional ratio-less type logic circuit permits the use of small MIS transistors so that relatively large numbers of the transistors can be provided on a substrate of a given size, this circuit also necessitates power source conductors for supplying power to the MIS transistors, grounding conductors and conductors for a three- or four-phase clock pulse, in addition to conductors connected with the input and output terminals. The electric fields of these conductors exert an influence upon the substrate, so that the transistors cannot be disposed as close to one another as would otherwise be expected and the overall power consumption cannot be reduced to the full extent made possible by the small MIS transistors.

Accordingly, it is an object of this invention to provide integrated circuits that are free of the above-mentioned disadvantages of previously proposed circuits using MOS or MIS transistors.

A specific object of the invention is to provide compact integrated logic circuits that do not require a DC power source.

Another object is to provide integrated logic circuits in which the semiconductor substrate common to all of the transistors functions as a grounding conductor.

A further object is to provide digital logic circuits employing relatively small numbers of transistors.

A still further object is to provide ratio-less type integrated circuits which are operated by the supplying of clock pulses thereto, and which do not require a DC power source.

Such ratio-less type integrated circuits according to the invention have the following advantages:

1. The clock pulse may be two-phase so that the wiring or conductors required for the integrated circuit are simplified.

2. Since the MIS transistors employed may be of the same miniaturized size, their density on a common substrate may be high and their switching speed is high.

3. Since the signal level is determined independently of the transconductance $g_m$ of the MIS transistors, dispersion caused in the manufacture of the MIS transistors does not matter and this facilitates the fabrication of the integrated circuit. Further, the resulting integrated logic circuit is not adversely affected by noise.

4. A current flows in the circuit only when a clock pulse is supplied and it is sufficient only to charge the stray capacity of the MIS transistor circuits, so that power consumption is small.

5. Neither a DC power source nor interconnections for power source supply are required.

6. A grounding connection need not be provided on the upper surface of the integrated circuit and instead the substrate is utilized as a conductor to ground. Accordingly, an insulator for example of silicon dioxide or silicon nitride, can be formed thin on the integrated circuit, and hence production of the integrated circuit is facilitated.

7. Since the current of the clock pulse flows only when the stray capacity is charged, a clock pulse generator that is simple in construction may be employed as the source of the clock pulses.

The above and other objects, features and advantages of the invention, sill be apparent in the following detailed description of illustrative embodiments to be read in connection with the accompanying drawings, in which.

Generally, in accordance with this invention, a circuit comprises two MIS transistors and having no power source terminal and a combinational circuit consisting of an AND gate circuit, an OR gate circuit, a bridge circuit or a combination thereof, also having no power source terminal and such components are formed as one unit on the same semiconductor substrate to provide an integrated logic circuit.

Figure 1:
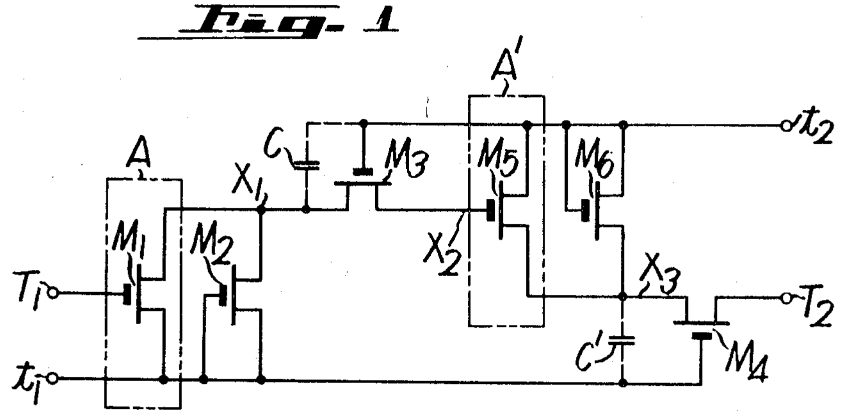
FIGS. 1, 3 and 5 are circuit diagrams of integrated logic circuits according to several embodiments of the invention.

In FIG. 1 there is illustrated a delay multivibrator circuit having the foregoing general arrangement and in which the MIS transistors are N-type enhancement insulated gate field effect transistors. If the polarity of a voltage used is reversed, P-type insulated gate field effect transistors can be employed.

In FIG. 1, reference character A indicates a combinational circuit which is made up of a single MIS transistor $M_1$ having neither a power source terminal nor an input terminal for clock pulse supply. The gate of MIS transistor $M_1$ is connected to an input terminal $T_1$ and the source of MIS transistor $M_1$ is connected to the gate and source of a MIS transistor $M_2$, with the gate and source of MIS transistor $M_2$ being also connected to a first clock pulse input terminal $t_1$. The drain of MIS transistor $M_1$ is connected to a junction $X_1$ which is also connected to the drain of MIS transistor $M_2$ and the source of a MIS transistor $M_3$. The gate of MIS transistor $M_3$ is connected to a second clock pulse input terminal $t_2$. Thus, a circuit unit according to this invention is provided the output of which is derived from the drain of MIS transistor $M_3$.

Further, in the embodiment of FIG. 1, the drain of MIS transistor $M_3$ is connected through a junction $X_2$ to the gate of a MIS transistor $M_5$ of a combinational circuit A' which has neither a power source terminal nor a clock pulse input terminal. The source of the MIS transistor $M_5$ is connected to the second clock pulse input terminal $t_2$ and to the gate and source of a MIS transistor $M_6$. Further, the drain of MIS transistor $M_5$ is connected to a junction $X_3$ which is also connected to the drain of MIS transistor $M_6$ and the source of a MIS transistor $M_4$. An output terminal $T_2$ is connected to the drain of MIS transistor $M_4$ and the gate of MIS transistor $M_4$ is connected to the first clock pulse input terminal $t_1$. In this case, the MIS transistors $M_1$ to $M_6$ are formed on a common semiconductor substrate and means (not shown) connect the substrate to ground.

Figures 2A, 2B, 2C, 2D, 2E, 2F, 2G:
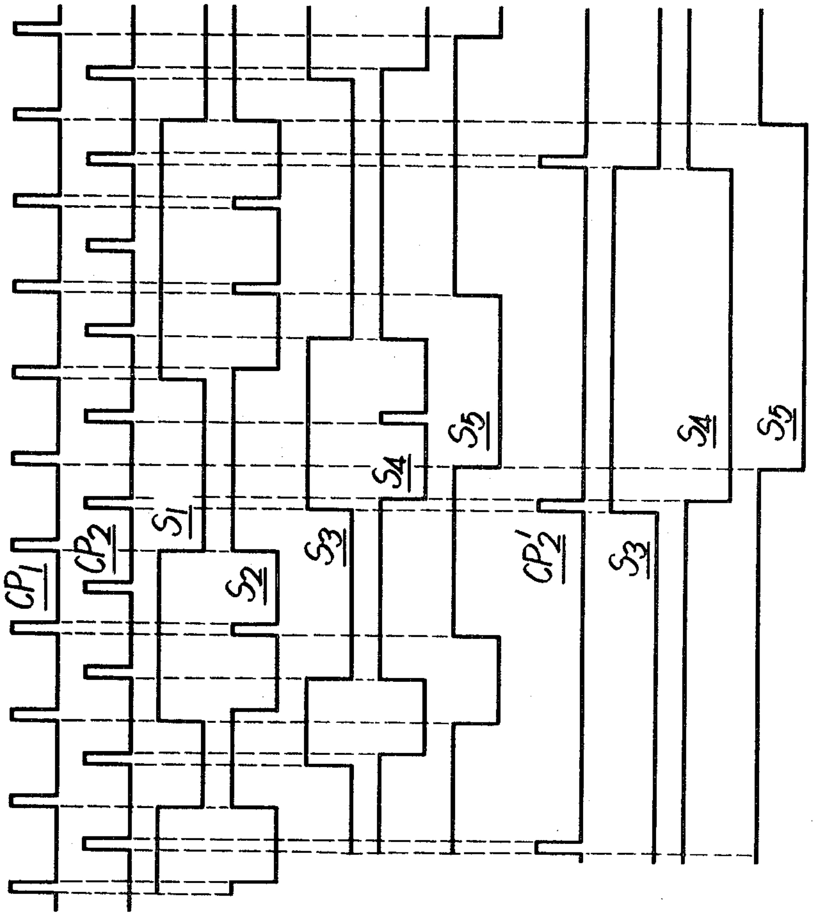
FIGS. 2, 4 and 6 are waveform diagrams to which reference will be made in explaining the operation of the embodiments of FIGS. 1, 3 and 5, respectively.

A clock pulse $CP_1$, such as is shown in FIG. 2A, and another clock pulse $CP_2$, such as is depicted in FIG. 2B, which has the same period as that of clock pulse $CP_1$ but a predetermined phase difference therefrom, are respectively applied between the terminals $t_1$, $t_2$ and the substrate ground.

In the following description of the operation of the circuit shown in FIG. 1, it will be assumed that the input terminal $T_1$ is supplied with an input pulse $S_1$, such as is depicted in FIG. 2C, which rises and falls in correspondence with the occurrence of pulses of the clock pulse $CP_1$. Further, in the following description a positive logic is used and a higher level of two values will be referred to as a level "1" and a lower level as a level "0."

With the input pulse $S_1$ applied by way of terminal $T_1$ to the gate of transistor $M_1$, the transistor $M_1$ is in the on state during each period when the input pulse $S_1$ is at the level "1" and is in the off state during each period of the level "0." Further, upon application of a clock pulse $CP_1$ to the gate of transistor $M_2$, transistor $M_2$ is turned on in the duration of the pulse $CP_1$ and, since the pulse $CP_1$ is also applied to the source of transistor $M_2$, the stray capacity, formed between the junction $X_1$ on the drain side of transistor $M_2$ and the substrate and the wiring for the clock pulse are charged, whereby there is produced at the junction $X_1$ an output of the level "1" for the duration of the pulse $CP_1$. When the pulse $CP_1$ decays, transistor $M_2$ is changed to its off state and if the transistor $M_1$ is then in the on state, the charge stored at the junction $X_1$ which is the output of the level "1" is discharged through transistor $M_1$ to provide an output of the level "0" at junction $X_1$. If, at the time of the decay of pulse $CP_1$, transistor $M_1$ is in the off state, the output of the level "1" at the junction $X_1$ is held unchanged. Consequently, an output $S_2$, such as is depicted in FIG. 2D, is produced at junction $X_1$ in response to the input pulse $S_1$ at terminal $T_1$.

With application of the clock pulse $CP_2$ to the gate of transistor $M_3$, transistor $M_3$ is turned on for the duration of the pulse $CP_2$ during which the level at the junction $X_1$ is "0." Accordingly, if transistor $M_1$ is in the on state when the level at the junction $X_2$ of the drain side of the transistor $M_3$ is "1," the charge at junction $X_2$ is discharged through transistors $M_1$ and $M_3$ to lower the level at junction $X_2$ down to "0" and hold it unchanged. If the level at junction $X_1$ is "1," and consequently the transistor $M_1$ is held in the off state, the stray capacity at junction $X_2$ is charged by the charge at junction $X_1$ up to the level "1" and, when the clock pulse $CP_2$ has decayed to the level "0" to turn off transistor $M_2$, the state at junction $X_2$ is memorized, so that there is produced at junction $X_2$ an output pulse $S_3$, such as is shown in FIG. 2E in response to the output pulse $S_2$ at junction $X_1$. It will be seen that the original $S_3$ is the inverse of the input original $S_1$, and is delayed by one-half period behind the input signal $S_1$. The foregoing represents the fundamental operation of a logic circuit unit according to this invention.

Further, in the circuit of FIG. 1, the output pulse $S_3$ is produced at the junction $X_2$ and is applied to the gate of transistor $M_5$ to hold it in the on state in the period of the level "1" of the pulse $S_3$ and hold it in the off state in the period of the level "0" of the pulse. While the clock pulse $CP_2$ is applied to the gate of the transistor $M_6$ to turn it on during the duration of the pulse $CP_2$, the pulse $CP_2$ is also applied to the source of transistor $M_6$ to produce an output of the level "1" at junction $X_3$ at the drain side of transistor $M_6$ during duration of the pulse $CP_2$. After the duration of the pulse $CP_2$, the transistor $M_6$ is turned off and, if transistor $M_5$ is in the on state, the charge at junction $X_3$, which is an output of the level "1," is discharged through transistor $M_5$ to produce an output of the level "0" at junction $X_3$. If transistor $M_5$ is in the off state, the output of the level "1" at junction $X_3$ is held unchanged. Consequently, there is derived at junction $X_3$ an output pulse $S_4$ such as is depicted in FIG. 2F in response to the output pulse $S_3$ at junction $X_2$.

Under such conditions, the pulse $CP_1$ is applied to the gate of transistor $M_4$ to turn it on for the duration of the pulse $CP_1$ and, if the level of the output pulse $S_4$ at junction $X_3$ is "1" while transistor $M_4$ is in the on state, an output of the level "1" is produced at the drain side of transistor $M_4$ and consequently at the output terminal $T_2$. In the event that the level of the output pulse at junction $X_3$ is "0," an output of the level "0" is derived at the output terminal $T_2$. Thus, there is produced at output terminal $T_2$ an output pulse $S_5$, such as is shown in FIG. 2G in response to the output pulse $S_4$ at junction $X_3$.

Accordingly, it will be apparent that application of the input pulse $S_1$ FIG. 2C to the input terminal $T_1$ results in the output pulse $S_5$ FIG. 2G being produced at the output terminal $T_2$. A comparison of the input pulse $S_1$ and the output pulse $S_5$ shows that the output pulse $S_5$ is delayed behind the input pulse $S_1$ by one period of the clock pulse, that is, by one bit time. Thus the circuit described above with reference to FIG. 1 functions as a delay multivibrator.

It will be apparent from the foregoing that the MIS transistor $M_1$ to $M_6$ operate with the clock pulse as a power source and that the transistors are not otherwise supplied with power from any external source. Thus, there is no continuous DC current flow in the transistors $M_1$ to $M_6$ and, in addition, the current for the clock pulse supply is a mere charging current for the small stray capacity. Therefore, the overall power consumption of the circuit is extremely low.

Further, since DC current is not supplied to the transistors $M_1$ to $M_6$ at all times, the usual power source of such DC current and power source the wiring or conductors therefor are unnecessary, which makes possible simplification of the overall construction, especially when the transistors $M_1$ to $M_6$ are formed on a common semiconductor substrate as previously described. Further, in circuits according to the invention the semiconductor substrate is grounded, so that individual conductors for grounding the semiconductor substrate for the respective transistors are unnecessary and this further simplifies the overall circuit construction.

Since transistors $M_2$ and $M_6$ are in the off state at the time when the levels of the outputs at junction $X_2$ and terminal $T_2$ are "0," the mutual conductance of transistors $M_2$ and $M_6$ need not to be so low as that required in the case where transistors $M_2$ and $M_6$ serve as loads in order to produce a step valve from the output level "0" to the output level "1" which is sufficiently high to cause the output level to be "0" at junction $X_2$ and terminal $T_2$. Accordingly, transistors $M_2$ and $M_6$ need not be larger in size than transistors $M_1$ and $M_3$, as distinguished from existing ratio-type logic circuits. Therefore, this invention makes possible the production of the integrated logic circuit on a semiconductor substrate of small area. On the other hand, if transistors $M_2$ and $M_6$ were made to be in the on state and a current could be applied to junctions $X_1$ and $X_3$ at the time when the output levels at junction $X_2$ and terminal $T_2$ are "0," the output level "0" could not be made to have a sufficiently great difference from the output level "1" unless the mutual conductance of transistors $M_2$ and $M_6$ was sufficiently decreased or that of transistors $M_1$ and $M_3$ was very substantially increased so as to provide the "0" output level at junction $X_2$ and the terminal $T_2$. Further, since transistors $M_2$ and $M_6$ need not have a low mutual conductance, it is possible to substantially shorten the rising time of pulses $S_2$ and $S_4$ when transistors $M_2$ and $M_6$ are in the on state, thereby to raise the clock pulse frequency and allow high-speed operation of the integrated logic circuit. In addition, even if the pulse width of the clock pulse is widened, the current flow is only enough to charge a small stray capacity of the circuit and memorize it. Therefore, it is not necessary to use a clock pulse of small pulse width to maintain a low power consumption, as widening of the pulse width will not appreciably increase the power consumption.

In the foregoing, the period of the clock pulse $CP_2$ has been issued to be equal to that of the clock pulse $CP_1$. However, even if a clock pulse $CP_2'$, such as is depicted in FIG. 2B', is employed which is synchronized with the pulse $CP_2$ of FIG. 2B, but is produced at intervals of a multiple of the period of the pulse $CP_2$, the output pulses $S_2$, $S_3$ and $S_4$ at junctions $X_1$, $X_2$ and $X_3$, respectively, become as shown in FIGS. 2D, 2E' and 2F' in response to the input pulse $S_1$ depicted in FIG. 2C, thus deriving at the output terminal $T_2$ an output pulse $S_5$ such as is shown in FIG. 2G'.

Figure 3:
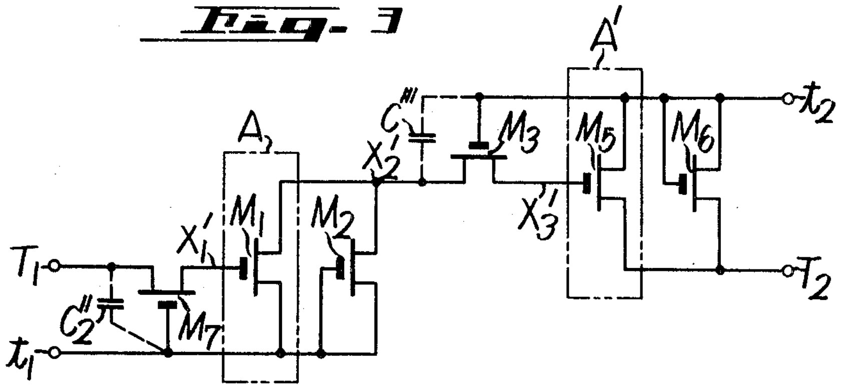

Turning now to FIG. 3, it will be seen that the present invention is there shown applied to another delay multivibrator circuit, in which elements corresponding to those in FIG. 1 are identified by the same reference numerals. In the circuit of FIG. 3 the drain of a MIS transistor $M_7$ is connected to the gate of MIS transistor $M_1$, the gate of transistor $M_7$ is connected to the source of transistor $M_1$ and input terminal $T_1$ is connected to the source of transistor $M_7$. In this case, MIS transistor $M_1$ again constitutes a combinational circuit A having neither a power source terminal nor an input terminal for clock pulse supply. The drains of MIS transistors $M_1$ and $M_2$ are interconnected and connected to the source of MIS transistor $M_3$. The source of transistor $M_1$ and the source and gate of transistor $M_2$ are connected together and connected to the first clock pulse input terminal $t_1$. The gate of transistor $M_3$, the source of MIS transistor $M_5$ and the source and gate of MIS transistor $M_6$ are connected to the second clock pulse input terminal $t_2$. Further, the drain of transistor $M_3$ is connected to the gate of transistor $M_5$ and the drains of transistors $M_5$ and $M_6$ are interconnected and connected to the signal output terminal $T_2$. In this case, the MIS transistors $M_1$, $M_2$, $M_3$, $M_5$, $M_6$ and $M_7$ are also formed on a common semiconductor substrate which is grounded.

Figures 4A, 4B, 4C, 4D, 4E, 4F, 4G:
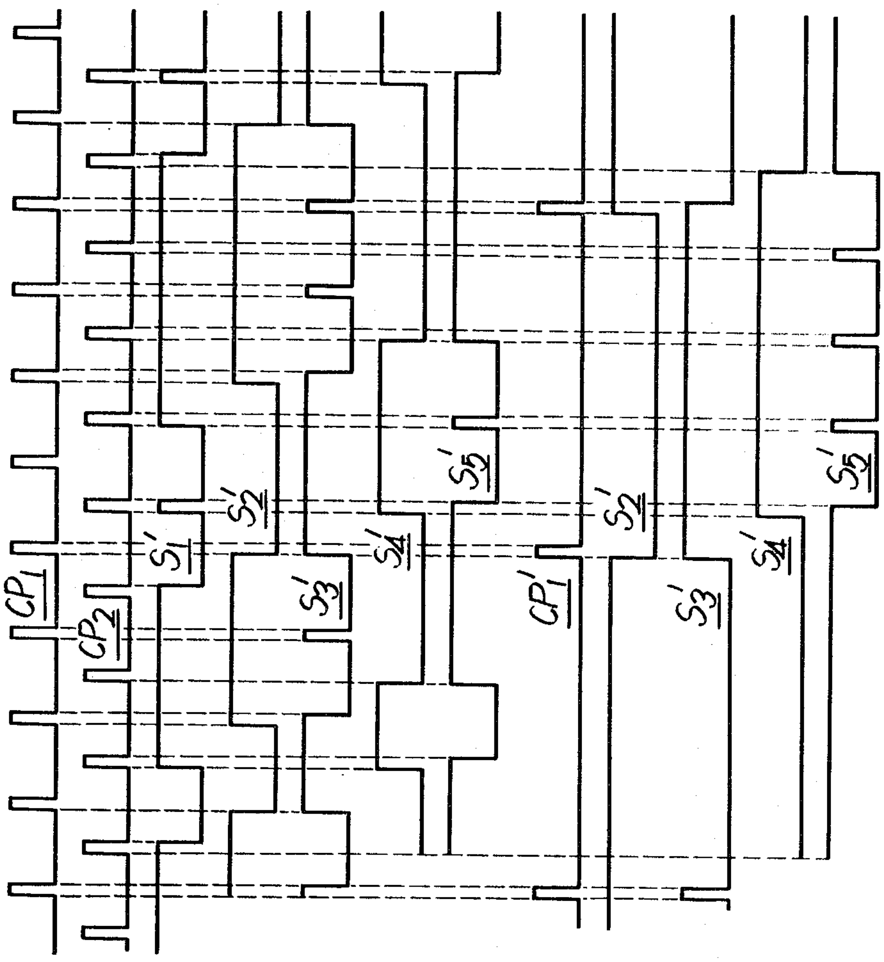

The terminal $t_1$ is supplied with a clock pulse $CP_1$ such as is depicted in FIG. 4A and terminal $t_2$ is supplied with a clock pulse $CP_2$ such as is shown in FIG. 4B. The following description will assume that the signal input terminal $T_1$ is supplied with an input pulse $S_1'$ such as is depicted in FIG. 4C and which again rises and falls in correspondence with pulses of the clock pulse $CP_2$.

When the clock pulse $CP_1$ is applied to the gate of transistor $M_7$ to turn it on for the duration of the pulse $CP_1$, and if the level of the signal $S_1'$ fed to input terminal $T_1$ is "0," the output level at junction $X_1'$ on the drain side of transistor $M_7$ becomes "0" and, if the level of signal $S_1'$ is "1," the level of the output at junction $X_1'$ becomes "1." Thereafter, when the level of the clock pulse $CP_1$ becomes "0" to turn off the transistor $M_7$, the state of junction $X_1'$ is memorized, so that an output pulse $S_2'$, such as is depicted in FIG. 4D is derived at junction $X_1'$ in response to signal $S_1'$.

The pulse signal $S_2'$ is applied to the gate of transistor $M_1$, so that transistor $M_1$ is caused to be in the on state while pulse $S_2'$ is at the level "1" and transistor $M_1$ is held in the off state while pulse $S_2'$ is at the level "0." The clock pulse $CP_1$ is applied to the gate and source of transistor $M_2$ to turn it on, and the charge by the current of the clock pulse $CP_1$ produces at junction $X_2'$ on the drain side of transistor $M_2$ an output whose level is "1" for the duration of the pulse $CP_1$. When the pulse $CP_1$ decays, transistor $M_2$ is turned off, in which case, if transistor $M_1$ remains in the on state, the charge at the junction $X_2'$, where the output has been at the level "1," is discharged through transistor $M_1$ to produce an output of the level "0" at junction $X_2'$. In the event that transistor $M_1$ is in the off state where pulse $CP_1$ decays, the output of the level "1" at junction $X_2'$ is held unchanged. Consequently, an output pulse $S_3'$ such as is depicted in FIG. 4E is derived at junction $X_2'$ in response to the signal $S_2'$.

Further, the clock pulse $CP_2$ is applied to the gate of transistor $M_3$ to hold it in the on state for the duration of the pulse $CP_2$ during which the output at junction $X_2'$ is at the level "0." Consequently, in the event that transistor $M_1$ is in the on state when the output at junction $X_3'$ on the drain side of transistor $M_3$ is at the level "1," the charge at junction $X_3'$ is discharged through transistors $M_1$ and $M_2$ to lower the level of the signal at junction $X_3'$ to "0." On the other hand, when the level of the signal at junction $X_3'$ is "0," such signal remains unchanged. When the signal at junction $X_2'$ is at the level "1," and hence transistor $M_1$ is in the off state, the signal at junction $X_3'$ is charged up to the level "1" by the charge at junction $X_2'$ and the level of the clock pulse $CP_2$ is lowered to "0" to turn off transistor $M_3$ and the state at junction $X_3'$ is memorized. Consequently, an output pulse $S_4'$ such as is shown in FIG. 4F is produced at junction $X_3'$ in response to the output pulse $S_3'$.

The resulting output pulse $S_4'$ is supplied to the gate of transistor $M_5$, so that transistor $M_5$ is in the on state while pulse $S_4'$ is at the level "1" and transistor $M_5$ is in the off state when the pulse $S_4'$ is at the level "0." The clock pulse $CP_2$ is applied to the gate of transistor $M_6$ to turn it on and hold it in the on state for the duration of the pulse $CP_2$, and, at the same time, the pulse $CP_2$ is fed to the source of transistor $M_6$, by which an output of the level "1" for the duration of the pulse $CP_2$ is produced at a point on the drain side of the transistor $M_6$, that is, at the output terminal $T_2$, by the current of the clock pulse $CP_2$ flowing in transistor $M_6$. Upon the decay of the pulse $CP_2$, transistor $M_6$ is turned off and, if transistor $M_5$ is then in the on state, the charge at terminal $T_2$ which has been an output of the level "1" is discharged through transistor $M_5$ producing an output of the level "0" at terminal $T_2$. If transistor $M_5$ is in the off state upon the decay of pulse $CP_2$, the output at output terminal $T_2$ is held unchanged at the level "1." As a result of this, an output pulse $S_5'$ such as is shown in FIG. 4G is produced at the terminal $T_2$ in response to the output pulse $S_4'$ at junction $X_3'$.

Thus, when the input pulse $S_1'$ shown in FIG. 4C is applied to input terminal $T_1$, the output pulse $S_5'$ depicted in FIG. 4G is produced at the output terminal $T_2$, and it will be seen that output pulse $S_5'$ is similar to the input pulse $S_1'$, but delayed with respect to the latter by one bit time. Accordingly, the circuit as illustrated in FIG. 3 also performs the function of a delay multivibrator circuit.

Further, it will be understood that the same operational effects as those previously described with reference to FIG. 1 can be obtained with the construction of FIG. 3.

The foregoing description of operation has assumed that the period of the clock pulse $CP_1$ is equal to that of the clock pulse $CP_2$. However, even if a clock pulse $CP_1'$, such as is shown in FIG. 4A', is employed which is synchronized with the pulse $CP_1$ of FIG. 4A but produced at intervals of a multiple of the period of the pulse $CP_1$, the output pulses $S_2'$, $S_3'$ and $S_4'$ at the junctions $X_1'$, $X_2'$ and $X_3'$, respectively, are then illustrated in FIGS. 4D', 4E' and 4F' as a result of the input pulse $S_1'$ shown in FIG. 4C, thus producing at the output terminal $T_2$ an output pulse $S_5'$ as depicted in FIG. 4G'.

Figure 5:
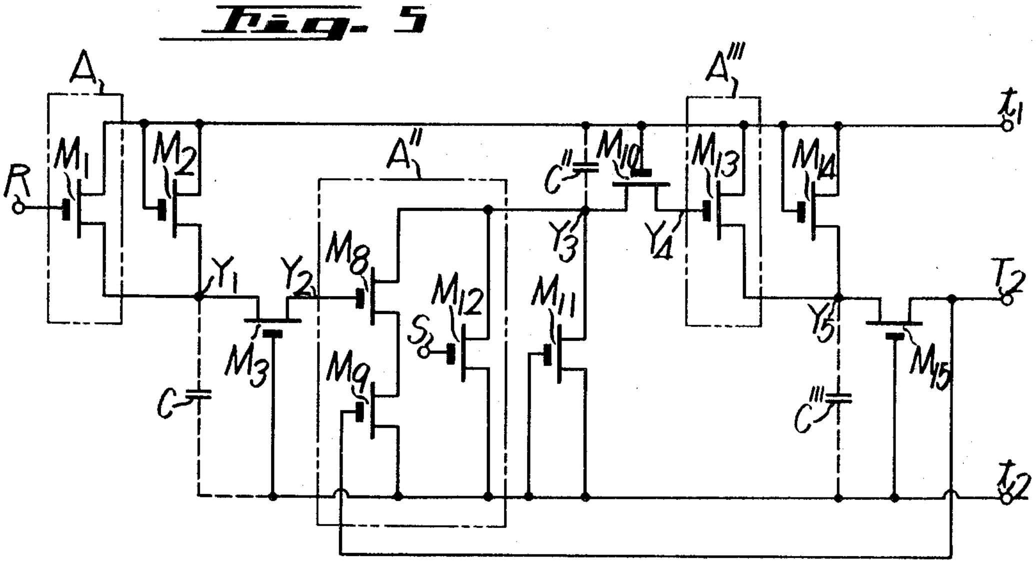

Referring now to FIG. 5, it will be seen that the present invention is then shown applied to a set-biased multivibrator circuit, in which the MIS transistors are P-type enhancement insulated gate field effect transistors and elements similar to those of FIG. 1 are identified by the similar reference numerals. In the circuit of FIG. 5, a reset signal input terminal R is connected to the gate of a MIS transistor $M_1$ constituting a combinational circuit A having neither a power source terminal nor a clock pulse input terminal, and the source of transistor $M_1$ is connected to the gate and source of a MIS transistor $M_2$. The gate and source of transistor $M_2$ are interconnected and the connection therebetween is connected to a first clock pulse input terminal $t_1$. The drain of transistor $M_1$ is connected at a junction $Y_1$ with the drain of transistor $M_2$ and with the source of a MIS transistor $M_3$. The gate of transistor $M_3$ is connected to a second clock pulse input terminal $t_2$. The drain of transistor $M_3$ is connected at a junction $Y_2$ to the gate of a MIS transistor $M_8$. The source of transistor $M_8$ is connected to the drain of a MIS transistor $M_9$, which in turn, has its source connected to the second clock pulse input terminal $t_2$. Further, the drain of the transistor $M_8$ is connected, at a junction $Y_3$, with the source of a MIS transistor $M_{10}$ and with the drain of a MIS transistor $M_{11}$. The gate and source of transistor $M_{11}$ are connected to the second clock pulse input terminal $t_2$. A connection point between the drains of transistors $M_8$ and $M_{11}$ is connected to the drain of a MIS transistor $M_{12}$, and the source of the latter is connected to the second clock pulse input terminal $t_2$ while the gate of transistor $M_{12}$ is connected to a set signal input terminal S. The gate of transistor $M_{10}$ is connected to the first clock pulse input terminal $t_1$ and the drain of transistor $M_{10}$ is connected to the gate of a MIS transistor $M_{13}$. The drain of transistor $M_{13}$ is connected, at a junction $Y_5$, with the drain of a MIS transistor $M_{14}$ and with the source of a MIS transistor $M_{15}$. The source of transistor $M_{13}$ and the gate and source of transistor $M_{14}$ are all connected to the first clock pulse input terminal $t_1$. The gate of transistor $M_{15}$ is connected to the second clock pulse input terminal $t_2$ and its drain is connected to an output terminal $T_2$ and to the gate of transistor $M_9$. Also in this case, the MIS transistors $M_1$ to $M_3$ and $M_8$ to $M_{15}$ are formed on a common semiconductor substrate, which is grounded. It will be seen that a circuit A constituted by transistor $M_1$, a circuit A'' made up of the interconnected MIS transistors $M_8$, $M_9$ and $M_{12}$ are a circuit 1''' constituted by the MIS transistor $M_{13}$ are combinational circuits which have neither power source terminals nor clock pulse input terminals.

Figures 6A, 6B, 6C, 6D, 6E, 6F, 6G, 6H, 6I, 6J:
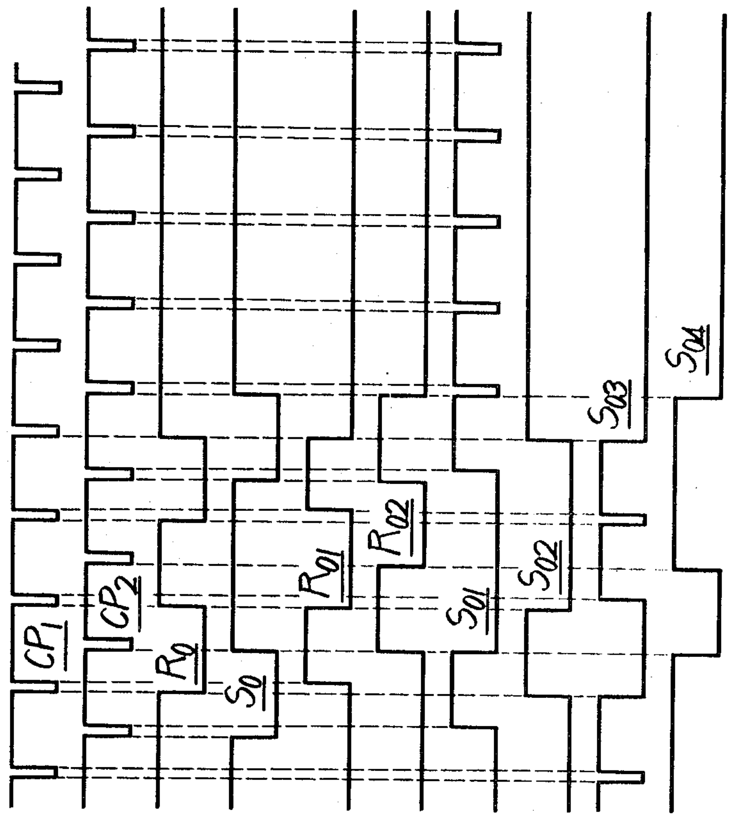

A clock pulse $CP_1$, such as is shown in FIG. 6A, is applied to the first clock pulse input terminal $t_1$ and a clock pulse $CP_2$, such as is depicted in FIG. 6B, is fed to the second clock pulse input terminal $t_2$. The embodiment of FIG. 5 has been described as employing P-type enhancement insulated gate field effect transistors as the MIS transistors. However, if the polarity of the voltage of the clock pulse used is reversed, N-type insulated gate field effect transistors can be employed.

In the following description of the operation of the circuit in FIG. 5, a negative logic is used and a higher level of two values will be referred to as a level "0" and a lower level as a level "1." Further, it will be assumed that the reset signal input terminal R is supplied with a reset input pulse $R_0$ such as is shown in FIG. 6C and which falls in synchronization with clock pulse $CP_1$ and that the set signal input terminal S is supplied with a set input pulse $S_0$ such as is depicted in FIG. 6D and which falls in synchronism with clock pulse $CP_2$.

The reset pulse $R_0$ is applied to the gate of transistor $M_1$ so that transistor $M_1$ is held in the on state while the reset pulse $R_0$ is at the level "1" and the transistor is in the off state while the pulse $R_0$ is at the level "0."

The clock pulse $CP_1$ is fed to the gate of transistor $M_2$ so that transistor $M_2$ is held in the on state for the duration of the clock pulse $CP_1$ and, at the same time, the pulse $CP_1$ is applied to the source of transistor $M_2$, whereby an output of the level "1" is produced for the duration of the pulse $CP_1$ at junction $Y_1$ on the drain side of the transistor $M_2$ by the current of the clock pulse $CP_1$ flowing through transistor $M_2$. When the pulse $CP_1$ decays to turn off transistor $M_2$ and, at such time, transistor $M_1$ is in the on state, the charge at junction $Y_1$ where the output has been at the level "1" is discharged through transistor $M_1$ to lower the output at junction $Y_1$ down to the level "0." In the event that the transistor $M_1$ is in the off state when pulse $CP_1$ decays, the output at junction $Y_1$ remains at the level "1." Consequently, a pulse $R_{01}$ such as is shown in FIG. 6E is derived at junction $Y_1$ is response to the reset pulse $R_0$ at the terminal R.

The application of the second clock pulse $CP_2$ to the gate of the transistor $M_2$ holds the latter in its conductive state for the duration of the pulse $CP_1$ during which the output level at junction $Y_2$ remains "0." Accordingly, when the transistor $M_1$ is in the on state, the charge of the output of the level "1" at junction $Y_2$ on the drain side of transistor $M_3$ is discharged through transistors $M_1$ and $M_2$ to lower the output level at junction $Y_2$ down to "0." When the output level at junction $Y_2$ is "0," it remains unchanged. When the output level at junction $Y_1$ is "1" and consequently transistor $M_1$ is in the off state, the output level at junction $Y_2$ is charged up to "1" by the charge at junction $Y_1$and, when the clock pulse $CP_1$ is turned off to change transistor $M_3$ to its off state, the state at junction $Y_2$ is memorized. Thus, a pulse $R_{02}$ such as is depicted in FIG. 6F is produced at junction $Y_2$ in response to the pulse $R_{01}$ at junction $Y_1$.

Further, the set pulse $S_0$ is fed to the gate of transistor $M_{12}$ so that transistor $M_{12}$ is held conductive when the set pulse $S_0$ is at the level "1" and the transistor $M_{12}$ is held nonconductive when the set pulse $S_0$ is at the level "0." The clock pulse $CP_2$ is applied to the gate of transistor $M_{11}$ so that transistor $M_{11}$ is held in the on state while the clock pulse $CP_2$ is "on" and, at the same time, the pulse $CP_2$ is applied to the source of transistor $M_{11}$, so that an output of the level "1" and a duration corresponding to the pulse duration of the pulse $CP_2$ is produced at junction $Y_3$ on the drain side of transistor $M_{11}$ by the current of the pulse $CP_2$ flowing therethrough. When the clock pulse $CP_2$ decays, transistor $M_{11}$ is turned off, in which case, if the transistor $M_{12}$ is conductive, the charge at junction $Y_3$ is discharged through transistor $M_{12}$, producing an output of the level "0" at junction $Y_3$. The output at junction $Y_3$ is affected by that at junction $Y_2$. Thus, when the output of the level "1" is produced at junction $Y_2$ to turn on transistor $M_8$ and the output of the level "1" is derived at the output terminal $T_2$ to render transistor $M_9$ conductive, the charge at junction $Y_3$ is discharged through transistors $M_8$ and $M_9$ to provide an output of the level "0" at Junction $Y_3$. In the cases where either of transistors $M_8$ and $M_9$, or both of them are in the off state and transistor $M_{12}$ is in the off state, the output of the level "1" at junction $Y_3$ is held unchanged. As a result of this, a pulse $S_{01}$ such as is depicted in FIG. 6G is derived at junction $Y_3$ in response to the set pulse $S_0$ at the terminal S, the pulse $R_{02}$ at junction $Y_2$ and the signal at the output terminal $T_2$.

The first clock pulse $CP_1$ is applied to the gate of transistor $M_{10}$, so that transistor $M_{10}$ is held conductive while the clock pulse $CP_1$ is "on." In such a case, when the output level at the point $Y_3$ is "0," that is, transistor $M_{12}$ is in the on state or the transistors $M_9$ and $M_8$ are both in the on state and the output level at junction $Y_4$ on the drain side of transistor $M_{10}$ is "1," the charge at junction $Y_4$ is discharged through transistors $M_{12}$ and $M_{10}$ or through transistors $M_9$, $M_8$ and $M_{10}$ to lower the output level at junction $Y_4$ down to "0." When the output level at junction $Y_4$ is "0" it remains unchanged. In the event that the output level at junction $Y_3$ is "1," the output level at junction $Y_4$ is raised up to "1" by the charge at junction $Y_3$ and, when the level of the clock pulse $CP_1$ becomes "0" to turn off the transistor $M_{10}$, the state at junction $Y_4$ is memorized. As a result of this, a pulse $S_{02}$ such as is shown in FIG. 6H is produced at junction $Y_4$ in response to the pulse $S_{01}$ at junction $Y_3$.

The pulse $S_{02}$ thus produced at junction $Y_4$ is applied to the gate of transistor $M_{13}$, by which the transistor $M_{13}$ is held conductive while the pulse $S_{02}$ remains at the level "1" and transistor $M_{13}$ is rendered nonconductive while the pulse $S_{02}$ is at the level "0." The clock pulse $CP_1$ is applied to the gate of transistor $M_{14}$ to render transistor $M_{14}$ conductive for the pulse duration of the pulse $CP_1$ and, at the same time, the pulse $CP_1$ is fed to the source of transistor $M_{14}$, through which the current of the pulse $CP_1$ flows to produce at junction $Y_5$ on the drain side of transistor $M_{14}$ an output of the level "1" for the pulse duration of the pulse $CP_1$. When the pulse $CP_1$ decays, transistor $M_{14}$ is turned off, in which case, if transistor $M_{13}$ is in the on state, the charge at junction $Y_5$ is discharged through transistor $M_{13}$ to produce an output of the level "0" at junction $Y_5$, whereas, if transistor $M_{13}$ is in the off state, the output of the level "1" at junction $Y_5$ is held unchanged. Accordingly, a pulse $S_{03}$ such as is depicted in FIG. 6I is produced at junction $Y_5$ in response to the pulse $S_{02}$ at junction $Y_4$.

The pulse $CP_2$ is supplied to the gate of transistor $M_{15}$ so that the transistor $M_{15}$ is held conductive or in its on state for the pulse duration of the pulse $CP_2$. While transistor $M_{15}$ is in the on state, if the level of the output pulse as junction $Y_5$ is "1," the output of the level "1" is derived at the drain side of transistor $M_{15}$ and consequently at output terminal $T_2$, whereas, if the level of the output at junction $Y_5$ is "0," the output of the level "0" is produced at the output terminal $T_2$. Consequently, an output pulse $S_{04}$ such as is depicted in FIG. 6J is derived at the output terminal $T_2$ in response to the output pulse $S_{03}$ at junction $Y_5$.

Thus, when the set signal $S_0$ is applied to the set signal input terminal S earlier than reset signal $R_0$, the multivibrator circuit naturally initiates its operation with the set signal $S_0$. However, if the reset signal $R_0$ is applied to the reset signal input terminal R earlier than the set signal $S_0$ by ½ bit time, the signal $S_{04}$ shown in FIG. 6J is produced at the output terminal $T_2$. It will also be apparent that the same operational effects as those described with reference to FIG. 1 can be obtained with the set biased multivibrator circuit illustrated in FIG. 5.

Figure 7A:
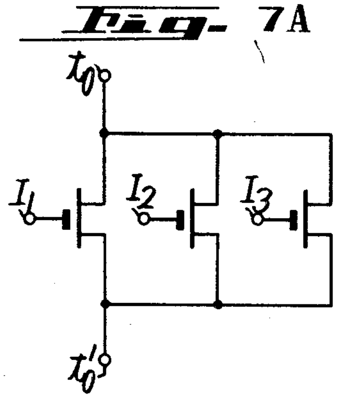
FIGS. 7A, 7B and 7C are circuit diagrams of several combinational circuits that can be employed in logic circuits embodying this invention.
Figure 7B:
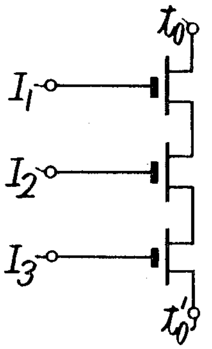
Figure 7C:
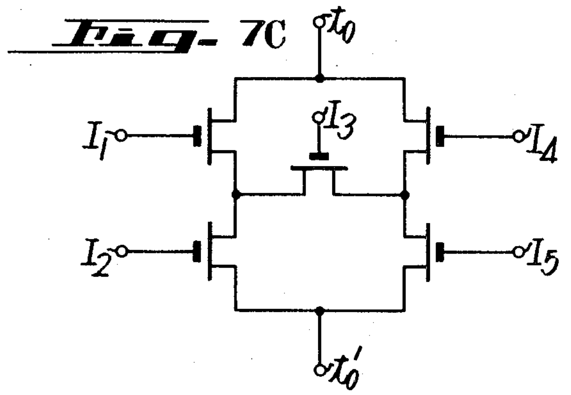

The combinational circuits A, A′, A″ and A‴, which are made up of MIS transistors without any power source terminal and without any input terminal for the clock pulse supply, may be replaced by an OR circuit consisting of a plurality of MIS transistors connected in parallel relation as shown in FIG. 7A, or by an AND circuit consisting of a plurality of MIS transistors connected in series as shown in FIG. 7B, or by a bridge circuit consisting of MIS transistors as depicted in FIG. 7C. Further, it is also possible to use combinational circuits made up of the circuits of FIGS. 7A, 7B and 7C in combination. In FIGS. 7A, 7B and 7C, reference characters $I_1$ to $I_5$ indicate signal input terminals and $t_0$ and $t_0'$ designate detected output terminals.

Further, it is preferred that capacitors C, C', C'' and C''' be connected between the gates and sources of MIS transistors $M_3$, $M_4$, $M_7$ $M_{10}$ and $M_{15}$ as indicated in broken lines on FIGS. 1, 3 and 5. With the provision of the capacitors, the sources sides of MIS transistors $M_3$, $M_4$, $M_7$, $M_{10}$ and $M_{15}$ are capacitively excited by the clock pulse so that, when the combinational circuits A, A', A'' and A''' are in the off state or the signal level at the input terminal $T_1$ in FIG. 3 is "1," the level "1" of the outputs on the source sides of MIS transistors $M_3$, $M_4$, $M_7$, $M_{10}$ and $M_{15}$ is increased more than in the corresponding embodiments as originally described and the outputs are derived at the output sides as charging voltages at the drain sides of transistors $M_3$, $M_4$, $M_7$, $M_{10}$ and $M_{15}$.

In any of the circuits described with reference to FIGS. 1, 3, and 5, the source and drain of each MIS transistor can be exchanged without altering the previously described operational effects.

Although several logic circuits embodying this invention have been described in detail herein with reference to the accompanying drawings, it is to be understood that the invention is not limited to these precise embodiments, and that various modifications and changes may be effected therein by one skilled in the art without departing from the scope or spirit of the invention.

What we claim is:

1. An integrated logic circuit for delaying an input signal by one bit period and having only two clock pulse receiving terminals, said integrated circuit comprising a first combinational circuit having an input terminal for receiving an input signal and two output terminals and consisting of at least one first field effect transistor, two additional first field effect transistors, a second combinational circuit having an input terminal and two output terminals and consisting of at least one second field effect transistor, two additional second field effect transistors, all of said transistors having a common substrate which is grounded, each of said transistors having a gate electrode, a source electrode and a drain electrode, means connecting in parallel relation the source-drain circuit of each of said first and second field effect transistors with said two output terminals of the respective combinational circuit, means connecting the gate electrode of one of said additional first and second field effect transistors with one of said output terminals of said first and second combinational circuits, respectively, means connecting the source-drain circuit of the other of said additional first and second field effect transistors with the other of the output terminals of said first and second combinational circuits, respectively, means connecting said source-drain circuit of said other additional first field effect transistor with said input terminal of the second combinational circuit, means for supplying a first clock pulse to the gate electrodes of said one additional first field effect transistor and said other additional second field effect transistor by way of one of said two clock pulse receiving terminals, and means for supplying a second clock pulse to the gate electrodes of said other additional first field effect transistor and said one additional second field effect transistor by way of the other of said two clock pulse-receiving terminals, said second clock pulse avoiding overlapping with said first clock pulse, whereby said input signal delayed by one bit period is obtained through the source-drain circuit of said other additional second field effect transistor.

2. An integrated logic circuit according to claim 1, in which said first and second clock pulses are timed to render said additional first field effect transistors and said additional second field effect transistors alternately conductive.

3. An integrated logic circuit according to claim 1, in which a capacitor is connected between said other output terminal of each of said combinational circuits and said gate electrode of said other additional first and second field effect transistors, respectively.

4. An integrated logic circuit according to claim 1, wherein at least one of said combinational circuits is in the configuration of an AND gate circuit.

5. An integrated logic circuit according to claim 1, wherein at least one of said combinational circuits is in the configuration of an OR gate circuit.

6. An integrated logic circuit according to claim 1, wherein at least one of said combinational circuits is in the configuration of a bridge circuit.

* * * * *